Oct. 23, 1928.
P. MUELLER ET AL
NO-SLIP FLANGE
Filed Oct. 17, 1925
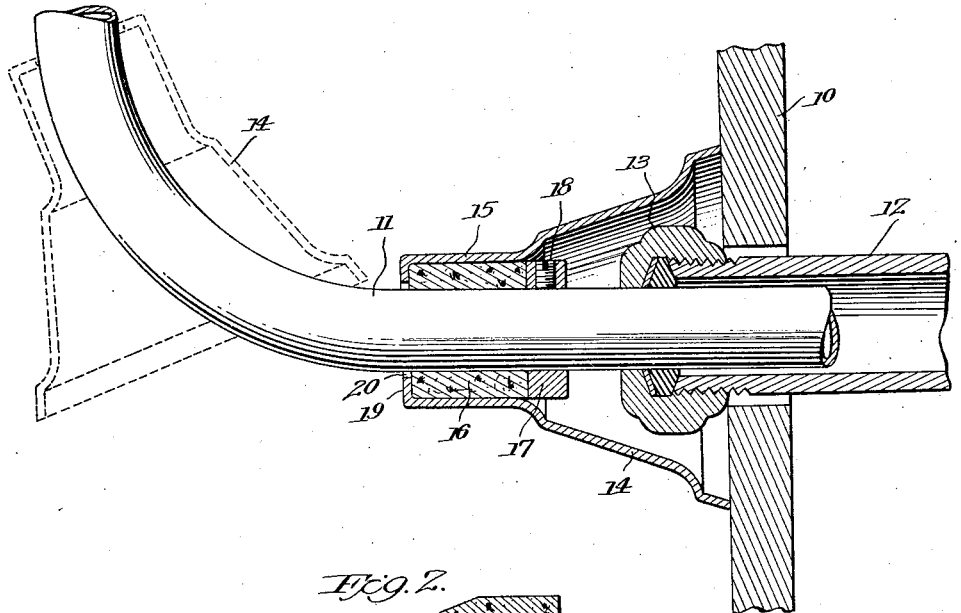
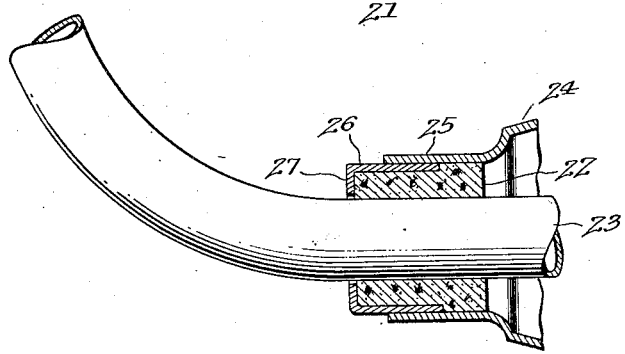
Inventors
Philip Mueller,
Anton C. Schuermann, DECEASED,
Helena Schuermann, EXECUTRIX.

Patented Oct. 23, 1928.

1,688,629

UNITED STATES PATENT OFFICE.

PHILIP MUELLER, OF DECATUR, ILLINOIS, AND ANTON C. SCHUERMANN, DECEASED, LATE OF DECATUR, ILLINOIS, BY HELENA SCHUERMANN, EXECUTRIX, OF DECATUR, ILLINOIS, ASSIGNORS TO ADOLPH MUELLER, TRUSTEE, OF DECATUR, ILLINOIS.

NO-SLIP FLANGE.

Application filed October 17, 1925. Serial No. 63,189.

The present invention relates to no-slip flanges, used in connection with water, steam, and gas pipes and the like, or wherever in plumbing work it is desirable or necessary to use flanges or escutcheons to finish or cover the ceiling, wall, or panel apertures through which the pipes pass.

The invention is for subject matter disclosed but not claimed in Patent No. 1,502,154, granted July 22, 1924, applied for May 25, 1923, and is made the subject of a separate case under official requirement.

One of the essential objects of the invention is to provide a no-slip flange or escutcheon with a friction member so positioned as to form a non-metallic connection between the service pipe and the escutcheon, and which, when the parts are set up, positively holds the escutcheon in any desired position on the pipe or fitting.

To accomplish this result, we have devised the no-slip flange, herein shown, in which a friction ring of non-corrosive material, such as cork or the like, is inserted between the pipe and a portion of the escutcheon in such a manner as to provide a non-metallic connection between the escutcheon and the supply pipe, and which admirably meets the needs of the situation.

The invention, as will appear, embodies also certain mechanical features in the make-up of the no-slip flange, which tend to improve and render devices of this character more dependable and efficient in use.

In the drawings:

Figure 1 is a sectional view of a panel, pipe and canopy with the invention applied thereto.

Figure 2 is a sectional view of the friction ring.

Figure 3 is a sectional view of a modified form of the invention.

Referring to the drawings, in which like numerals indicate like parts in the several views, 10 denotes a panel or other suitable support through which the pipes 11 and 12 pass. In the present instance these pipes are arranged to telescope one within the other, and are secured by any suitable connection, such as the packed coupling nut or joint 13. Obviously, the showing, so far as the pipe assembly and support is concerned, is merely conventional, since the no-slip flange or escutcheon, forming the subject matter of the invention, may be utilized with various pipes, connections, and fixtures, by changing its design and makeup, so as to conform to the particular type of fixture with which it is to be applied.

Such fixtures are usually finished by means of a flange or escutcheon covering the joint and the opening in the panel, ceiling, or other support, through which the pipes pass. The escutcheon 14 here shown is particularly adapted for use in connection with a pipe having a bend near the wall, through which it projects, and is formed with a reduced annular neck 15, at its rear end, which receives the friction ring 16, said ring being preferably composed of non-corrosive material, such as cork or the like, so as to give an extended bearing on the pipe that will sustain the escutcheon against either longitudinal or tilting movement. A slidable collar 17, which is adjustably secured to the supply pipe 11 by the set screw 18, maintains the ring 16 in suitable spaced relation to the panel 10.

The flange is installed by mounting the escutcheon 14, together with the friction ring 16 and the collar 17, on the pipe 11, and then inserting the supply pipe 11 in the service pipe 12. The pipes 11 and 12 having been assembled, the escutcheon is slid back over the bend in the pipe 11, as indicated in dotted lines in Figure 1, to allow sufficient space to tightly set up the coupling or clamping nut 13 on the service pipe 12. After the coupling 13 has been secured to the supply pipe, the escutcheon 14 and friction ring 16 are moved toward the wall 10. As the escutcheon is moved, the friction ring 16 will be forced tightly into the neck 15 by the fixed collar 17, until it is brought into engagement with the annular end flange 19 of the escutcheon.

A clearance 20 is preferably provided between the flange 19 and the pipe 11 so as to insure a non-metallic connection of the escutcheon with the pipe and eliminate the possibility of the parts sticking or corroding.

The friction ring 16 may be tapered slightly at 21, as shown in Figure 2, so as to facilitate its entrance into the neck 15 of the escutcheon, it being understood that the ring 16 has an external diameter somewhat larger than the internal diameter of the neck 15. When the parts are assembled and the escutcheon is forced to the full line position shown in Figure 1, the ring 16 will be compressed not only longitudinally between the flange 19 and the collar 17, but also radially between the wall of the neck 15 and the pipe 11. This will firmly wedge the ring in position and maintain the escutcheon 14 against tilting or sliding on the pipe.

In the modified form shown in Figure 3, the construction is very much similar to that disclosed in Figure 1, with the exception that the escutcheon 24 has the end of its reduced cylindrical portion 25 open so as to receive the collar or cap 26 having an annular end flange 27. The flange 27 acts as an abutment for one end of the friction ring 22, which fits tightly within the reduced portion of the escutcheon and the cap 26.

In setting up the device, the escutcheon is placed on the supply pipe 23 and slid back over the bend in the same manner as shown in Figure 1. The collar 26 and the friction ring 22 will then be placed on the pipe in the order mentioned, and the friction ring clamped to the pipe by forcing the rear portion of the ring into the collar 26. The escutcheon is then moved forward over the collar 26 and into engagement with the wall of the fitting, thus providing a neat and attractive appearance for the pipe connection, as shown.

It will be seen that by reason of the present construction, there is provided a very efficient no-slip flange, which will maintain its position when once set up and will not stick or corrode upon the pipe after it has been in place for a long time; due to the fact that the cork, of which the ring is made, is capable of withstanding moisture and the corrosive action to which devices of this type are usually subjected when mounted upon metal. Furthermore, the ring will retain its form after having been once placed in position without the necessity of adjustable means for keeping it in proper gripping engagement with the pipe or the escutcheon.

Obviously, the form of the invention shown and described is to be considered as merely illustrative and in no sense restrictive, and such changes as fall within the purview of one skilled in the art may be made without departing from the range of the invention.

We claim:

1. A no-slip flange comprising an escutcheon having a reduced neck, a friction ring of cork inserted in said neck to frictionally engage the wall thereof and constrict its pipe engaging orifice, and independent means adapted to be secured to a pipe to hold said friction ring in place.

2. A no-slip flange comprising an escutcheon having a reduced neck and a friction ring of non-corrosive material inserted in said neck and having a normally tapered end and adapted when mounted on a pipe and compressed longitudinally to expand and frictionally engage the wall of the escutcheon, and means for compressing said friction ring.

3. A no-slip flange comprising an escutcheon having a reduced neck, and a friction ring of cork inserted in said neck and having a normally tapered end and adapted when mounted on a pipe and compressed longitudinally to expand and frictionally engage the wall of the escutcheon, and means for compressing said friction ring.

4. In a fitting of the class described, the combination with a pipe, of a hollow escutcheon having a reduced neck, provided with an end flange, a friction ring of cork mounted on said pipe and engaging said flange to provide a non-metallic frictional connection between the pipe and the escutcheon, and independent means on said pipe to positively hold the friction ring in position.

5. In a fitting of the class described, the combination with a pipe, of an escutcheon having a reduced neck provided with an end flange, a friction ring of non-corrosive material mounted on said pipe, independent of the escutcheon and engaging the wall of said neck to provide a non-metallic frictional connection between the pipe and the escutcheon, and means for limiting movement of the friction ring relative to the escutcheon lengthwise of the pipe and away from the end flange.

6. In a fitting of the class described, the combination with a pipe, of an escutcheon having a reduced neck, a friction ring of cork mounted on said pipe, independent of the escutcheon and engaging the wall of said neck to provide a non-metallic frictional connection between the pipe and the escutcheon, and means for limiting movement of the friction ring within the neck toward the body of the escutcheon.

7. In a fitting of the class described, the combination with a pipe, of an escutcheon having a reduced neck provided with an end flange, a friction ring of non-corrosive material mounted on said pipe and engaging said flange to provide a non-metallic frictional connection between the pipe and the escutcheon, and independent means on said pipe to positively hold the friction ring in position.

8. In a fitting of the class described, the combination with a pipe, of a hollow escutcheon having a reduced neck provided with an end flange, a friction ring of non-corrosive material mounted on said pipe and engaging said flange to provide a non-metallic frictional connection between the pipe and the escutcheon, and a collar independent of the escutcheon on said pipe to positively hold the friction ring in position.

9. The combination with a pipe, of a no-slip flange comprising an escutcheon, a friction ring of non-corrosive material within said escutcheon and mounted on said pipe, said ring having a normally tapered end and adapted when compressed to expand and frictionally engage the wall of the escutcheon, and independent means on said pipe adapted to compress and positively hold the friction ring in position.

In testimony whereof, we PHILIP MUELLER, and HELENA SCHUERMANN, executrix of the last will and testament of Anton C. Schuermann, deceased, have hereunto set our hands.

PHILIP MUELLER.
HELENA SCHUERMANN,
*Executrix of said Anton C. Schuermann, deceased.*